(12) United States Patent
Fu

(10) Patent No.: US 9,337,940 B2
(45) Date of Patent: May 10, 2016

(54) SECOND-ORDER INTERMODULATION DISTORTION CALIBRATION APPARATUS, SYSTEM AND METHOD

(71) Applicant: MStar Semiconductor, Inc., Hsinchu Hsien (TW)

(72) Inventor: Yuan-Yu Fu, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 180 days.

(21) Appl. No.: 13/950,765

(22) Filed: Jul. 25, 2013

(65) Prior Publication Data

US 2014/0030988 A1 Jan. 30, 2014

(30) Foreign Application Priority Data

Jul. 26, 2012 (TW) .............................. 101127028 A

(51) Int. Cl.
*H04B 1/44* (2006.01)
*H04B 15/00* (2006.01)
*H04B 17/14* (2015.01)
*H04B 17/318* (2015.01)
*H04B 17/00* (2015.01)
*H04B 1/38* (2015.01)

(52) U.S. Cl.
CPC ................ *H04B 15/00* (2013.01); *H04B 17/14* (2015.01); *H04B 17/318* (2015.01)

(58) Field of Classification Search
CPC ....... H04B 15/00; H04B 17/14; H04B 17/318
USPC ..................... 455/67.11, 67.14, 226.1, 73, 78
See application file for complete search history.

(56) References Cited

U.S. PATENT DOCUMENTS

| | | | | |
|---|---|---|---|---|
| 2005/0130595 A1* | 6/2005 | Shurvinton | .......... | H03G 3/3047 455/67.11 |
| 2008/0310529 A1* | 12/2008 | Futatsugi | .......... | H04L 25/03343 375/260 |
| 2010/0093298 A1* | 4/2010 | Pratt et al. | .................. | 455/226.1 |
| 2011/0128992 A1* | 6/2011 | Maeda et al. | ................. | 375/130 |
| 2012/0077452 A1* | 3/2012 | Dufr ne et al. | ............. | 455/226.1 |

OTHER PUBLICATIONS

Taiwan Patent Office, "Office Action", Aug. 6, 2014.

* cited by examiner

*Primary Examiner* — Ayodeji Ayotunde
(74) *Attorney, Agent, or Firm* — WPAT P.C.; Justin King

(57) ABSTRACT

A second-order intermodulation distortion calibration apparatus is provided. The calibration apparatus is applied to a radio-frequency (RF) transceiver, which includes a transmitter for providing an RF signal, and a receiver that is at the same time a target to be calibrated. The calibration apparatus includes a calibrator. The calibrator utilizes a logic circuit in the transmitter to generate two modulation signals having different frequencies, and utilizes two transmission paths to up-convert and combine the two modulation signals to an RF transmission signal. The calibrator further channels the RF transmission signal to the receiver to accordingly adjust second-order non-linear behaviors of the receiver and to detect a signal strength of a second-order crossover component caused by the receiver due to the second-order non-linearity. After the calibration process, the calibrator provides a control signal to minimize the signal strength of the second-order crossover component.

15 Claims, 4 Drawing Sheets

SECOND-ORDER INTERMODULATION DISTORTION CALIBRATION APPARATUS, SYSTEM AND METHOD

This application claims the benefit of Taiwan application Serial No. 101127028, filed Jul. 26, 2012, the subject matter of which is incorporated herein by reference.

BACKGROUND OF THE INVENTION

1. Field of the Invention

The invention relates in general to wireless communication, and more particularly, to a calibration method and apparatus for intermodulation distortion in wireless communication.

2. Description of the Related Art

A wireless communication system, a radio-frequency (RF) front-end circuit in particular, usually contains non-ideality of non-linearity. When an input end of a wireless communication system receives external interferences, and especially when interference signals simultaneously having two or more different frequencies, a crossover component is incurred in the two interference signals due to the non-linearity of the system. If the frequency of the crossover component is similar to that of a target signal, the target signal becomes interfered to lead to demodulation complications, as well as a reduced sensitivity of the system. For example, assume frequencies of input signals are $(f_{RF}+f_1)$, $(f_{RF}+f_2)$ and $(f_{RF}+f_3)$. The frequencies $f_1$, $f_2$ and $f_3$ are target frequencies; the frequency $f_{RF}$ is the RF carrier frequency. The frequencies of second-order crossover components can be a sum of or a difference between every two target frequencies, e.g., $(f_1+f_2)$, $(f_1-f_2)$, $(f_1+f_3)$ or $(f_1-f_3)$; the frequencies of third-order components can be a combination of the three target frequencies, e.g., $(f_1+f_2+f_3)$ or $(f_1+f_2-f_3)$.

For a communication system in a superheterodyne structure based on an intermediate frequency (IF), interferences of third-order crossover components are usually more obvious. A receiver in a superheterodyne structure first down-converts an RF signal to an IF signal and then further to a baseband signal. Provided that the frequency position of the IF is appropriately selected for cooperating with a filter, second-order crossover components generally do not cause damages.

Moreover, for a communication system in a homodyne structure (or referred to as a direct-conversion structure) that does not involve IF signals or in a low IF structure based on IF signals in extremely low frequencies, interferences of second-order crossover components are more severe. In a homodyne structure, a receiver directly down-converts an RF signal to a baseband signal, and a transmitter directly up-converts a baseband signal to an RF signal. A homodyne structure is more cost-competitive as IF and associated circuits are eliminated, and thus prevails in certain cost-effective 3C communication products. However, second-order crossover components are prone to occur near target frequencies since only one up-conversion/down-conversion process is performed in the modulation. Therefore, in order to enhance signal sensitivity in a wireless communication system, calibration is needed for second-order intermodulation distortion to reduce the second-order crossover components generated during the modulation.

FIG. 1 shows a direct-conversion receiver 10 supporting second-order intermodulation distortion calibration. The receiver 10 may be implemented by an integrated circuit. A low-noise amplifier (LNA) 14 amplifies an RF signal received by an antenna 12. A local oscillator 20 provides local oscillation signals in a 90-degree phase difference to mixers 16 and 18, respectively, to down-convert the RF signal to generate a baseband signal. A receiver core 22 processes the baseband signal, e.g., by demodulation, to obtain information carried in the baseband signal.

A calibrator 26 performs second-order intermodulation distortion calibration during a final test after the receiver 10 is packaged. A test machine provides two known RF test signals in different frequencies $(f_{RF}+f_{t1})$ and $(f_{RF}+f_{t2})$ to an RF input end of the low-noise amplifier 14. The mixers 16 and 18 produce expectable target signals (having frequencies $f_{t1}$ and $f_{t2}$) and possible second-order crossover components (having frequencies $f_{t1}-f_{t2}$ and $f_{t1}+f_{t2}$), as shown in FIG. 1. The calibrator 26 adjusts the mixers 16 and 18 according to signal strengths of the second-order crossover components to minimize the signal strengths of the second-order crossover components.

A main reason to incur the second-order crossover components is that, in two ideal and completely matching different signal receiving paths, mismatching however is resulted from inevitable differences due to variations in a fabricating process or a circuit layout of an integrated circuit. FIG. 2 shows a mixer 30 operable in cooperation with second-order intermodulation calibration. The mixer 30 receives RF signals via two differential input ends RF+ and RF−, receives local oscillation signals via two other differential input ends LO+ and LO−, and outputs output signals $V_{OUT}$ via two different output ends. Resistors $R_P$ and $R_N$ serve as output loads of the mixer 30. A calibrator may detect the signal strength of second-order crossover components in the output signals $V_{OUT}$ to adjust a calibration resistor $R_{CALI}$, so as to fine-tune the matching between two differential signal paths including the resistors $R_P$ and $R_N$.

However, in the above calibration method adopted in the final test, a desired calibration result can only be obtained after an extremely time-consuming process. In other words, substantial associated test costs are involved such that product competitiveness is lowered.

SUMMARY OF THE INVENTION

According to an embodiment the present invention, a second-order intermodulation distortion calibration apparatus is provided. The calibration apparatus is applied to a radio-frequency (RF) transceiver, which includes a transmitter and a receiver. The calibration apparatus includes a calibrator. The calibrator utilizes a logic circuit of the transceiver to generate two modulation signals having different frequencies, and two transmission paths to up-convert and combine the two modulations signals to an RF transmission signal. The calibrator further channels the RF transmission signal to the receiver to accordingly adjust second-order non-linear behaviors of the receiver, and to detect signal strengths of second-order crossover components generated by the receiver due to the non-linearity. After the calibration process ends, the calibrator provides a control signal to prompt the receiver to minimize the signal strengths of the second-order crossover components generated by the receiver.

According to another embodiment the present invention, a second-order intermodulation distortion calibration transceiver system capable is provided. The calibration transceiver system includes a transmitter, a receiver and a calibrator. The transmitter includes a logic circuit and two transmission paths. The logic circuit provides two modulations signals, which are in different frequencies when the calibration transceiver system operates in a calibration mode. The two transmission paths up-convert and combine the two modulation signals to an RF transmission signal. The receiver includes a reception path and a baseband signal processor. The reception path down-converts an RF reception signal to a baseband signal. When the calibration transceiver system operates in a calibration mode, the RF transmission signal serves as the RF reception signal, and the baseband processor processes the baseband reception signal. The calibrator adjusts the reception path in the calibration mode to minimize a signal strength of a second-order crossover component of the baseband reception signal.

According to another embodiment of the present invention, a second-order intermodulation distortion calibration apparatus is provided. The calibration apparatus is applied to an RF transceiver, which includes a transmitter and a receiver. The transmitter includes a logic circuit and two transmission paths. The logic circuit provides two modulation signals. The two transmission paths up-convert and combine the two modulation signals to an RF transmission signal. The receiver includes a reception path and a baseband signal processor. The reception path down-converts an RF reception signal to a baseband reception signal. The baseband signal processor processes the baseband reception signal. The calibration apparatus includes a calibrator. When the calibration apparatus operates in a calibration mode, the calibrator controls the logic circuit to provide two modulation signals having different frequencies, utilizes the RF transmission signal as the RF reception signal to be provided to the reception path, and adjusts the reception path to minimize a signal strength of a second-order crossover component of the baseband reception signal.

According to yet another embodiment of the present invention, a second-order intermodulation distortion calibration method is provided. The calibration method is applied to an RF transceiver, which includes a transmitter and a receiver. The calibration method includes: generating two modulation signals having different frequencies by the logic circuit, up-converting and combining the two modulation signals to an RF transmission signal by the two transmission paths, channeling the RF transmission signal to the receiver to serve as an RF reception signal, down-converting the RF reception signal to generate a baseband reception signal, and detecting a signal strength of a second-order crossover component in the baseband reception signal to accordingly adjust the receiver.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 3:
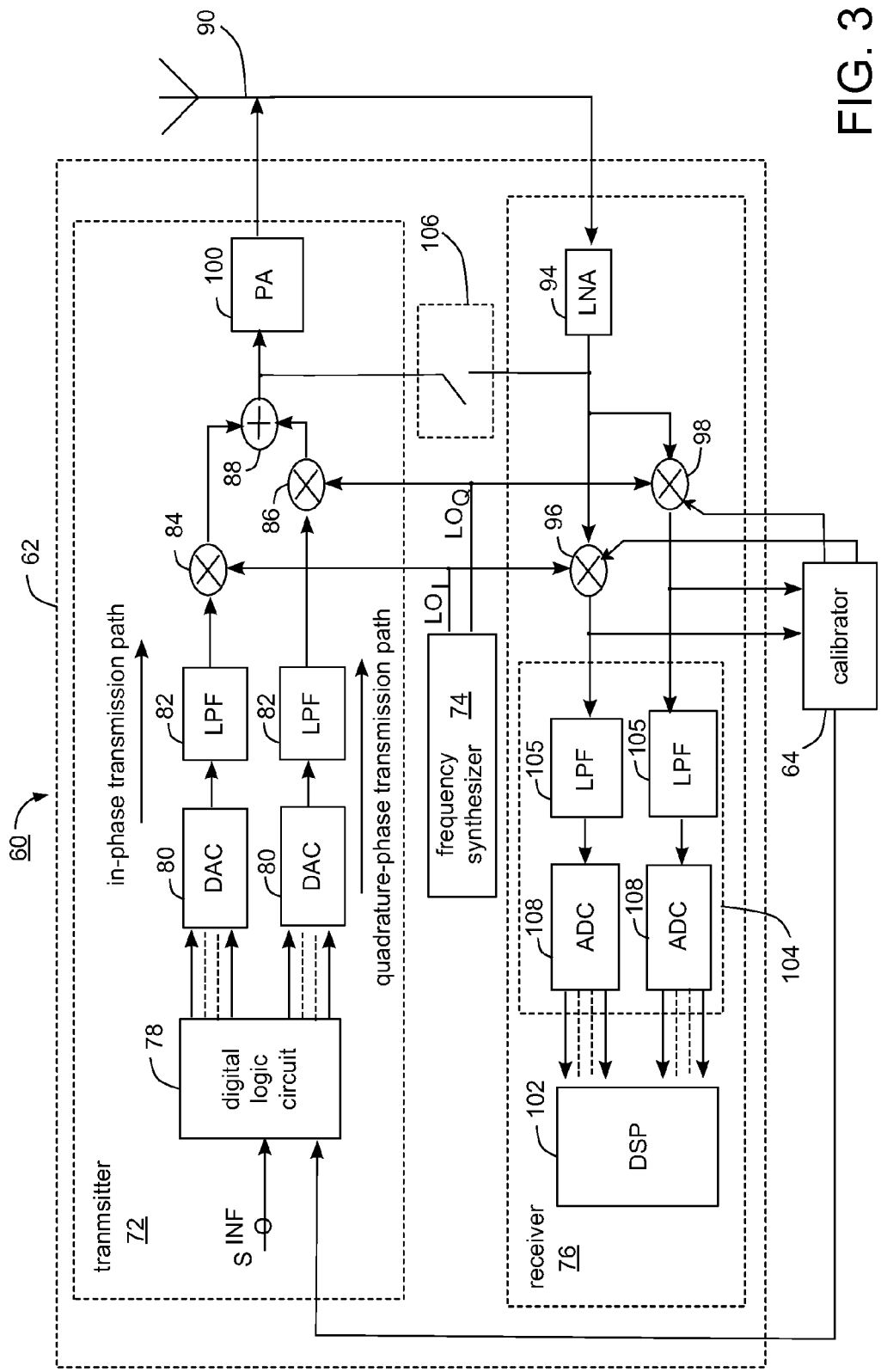
FIG. 3 is a calibration system according to an embodiment of the present invention.

FIG. 3 shows a calibration system 60 according to an embodiment of the present invention. The calibration system 60 is based on a homodyne structure, and includes a direct-conversion transceiver 62 and a calibrator 64. The direct-conversion transceiver 62 and the calibrator 64 may be implemented by an integrated circuit. The direct-conversion transceiver 62 includes a transmitter 72 and a receiver 76. The calibration system 60 can switch among several modes, e.g., the calibration system 60 is switchable and operable among a transmission mode, a reception mode and a calibration mode.

Under efficiency and cost considerations, the transceiver 62 includes only one frequency synthesizer 74. The frequency synthesizer 74 provides in-phase/quadrature local oscillation signals $LO_I$ and $LO_Q$ to be shared by mixers in the transmitter 72 and the receiver 74 to respectively perform up-conversion and down-conversion. In another embodiment, the transmitter 72 and the receiver 76 may respectively include a frequency synthesizer.

When the calibration system 60 operates in a transmission mode, a message $S_{INFO}$ in form of a digital-bit signal is transmitted to a digital logic circuit 78. The digital logic circuit 78 may be multifunctional, e.g., support debugging computation for a communication signal by increasing the number of digital bits. When operating in a transmission mode, the digital logic circuit 78 is at least capable of generating quadrature modulation signals $A(n)\cos\theta$ and $A(n)\cos(\theta(n)+\pi/2)$ according to the received digital-bit signal, where $A(n)$ and $\theta(n)$ are determined according to a modulation approach to be performed by the transmitter 72. For example, the modulation approach to be performed by the transmitter 72 may be phase-shift keying (PSK), frequency-shift keying (FSK) or amplitude-shift keying (ASK) modulation. Two signals that are quadrature to each other means that the two signals are separated by $\pi/2$ radians, i.e., a 90-degree phase. The two modulation signals share the same baseband frequency. One of the modulation signals is transmitted to an in-phase transmission path, whereas the other is transmitted to a quadrature-phase transmission path. As seen from FIG. 3, the digital logic circuit 78 ensures that the digital signals on the two paths differ by $\pi/2$ radians (or a 90-degree phase). On each transmission path, a digital-to-analog converter (DAC) 80 forwards the digital logic signal, and convert the modulation signal represented in the digital-bit form to an analog form. The analog modulation signals are filtered by a lower-pass filter (LPF) 82, and are respectively mixed with the local oscillation signals $LO_I$ and $LO_Q$ by mixers 84 and 86 and up-converted to RF transmission signals. The RF transmission signals outputted by the mixers 84 and 86 are combined by an adder 88, provided to a power amplifier (PA) 100 to increase the signal strength, and transmitted via an antenna 90.

When the calibration system 60 operates in a reception mode, the low-noise amplifier (LNA) 94 amplifies an RF signal received by the antenna 90. The local oscillation signals $LO_I$ and $LO_Q$ are respectively forwarded to mixers 96 and 98 to down-convert the RF signal to baseband signals. The mixers 96 and 98 are respectively located on an in-phase reception path and a quadrature-phase reception path. A baseband signal processor includes an analog signal processing circuit 104 and a digital signal processor (DSP) 102. For each reception path, the analog signal processing circuit 104 includes a low-pass filter (LPF) 105 and an analog-to-digital converter (ADC) 108, for respectively removing high-frequency components in the baseband reception signals outputted by the mixers 96 or 98, and converting the signals to a digital-bit form. One function supported by the DSP 102 is obtaining information carried in the baseband reception signal in the digital-bit form according to a demodulation approach to be performed by the receiver 76.

A coupling switch 106 is coupled between an output of the adder 88 and an output of the low-noise amplifier 94. When the calibration system 60 operates in the reception mode or the transmission mode, the coupling switch 106 is open so that the RF signal of one of the two ends in operation cannot reach the other end. In other words, when operating in the reception mode or the transmission mode, the signal on the transmission path in the transmitter 72 and the reception path are disconnected from each other to avoid interference. However, when operating in the calibration mode, the coupling switch 106 is a closed to channel the adder 88 to the reception path of the receiver 76. In an embodiment, the coupling switch 106 may include an inductor, a capacitor and a switch. The switch is selectively connected in parallel to the capacitor by controlling the inductor, so as to control equivalent impedance reflected by the coupling switch 106 with respect the RF signal. In another embodiment, the coupling switch 106 may also be a switch consisted of only a transistor, which controls the equivalent impedance by controlling a voltage.

The calibrator 64 controls the coupling switch 106, the mixers 96 and 98, and the digital logic circuit 78. When the closed-circuit coupling switch 106 respective channels the RF test signals to the mixers 96 and 98, similar to operations in the reception mode, the mixers 96 and 98 down-convert the RF test signals. The calibrator 64 respectively detects the signal strengths of the second-order crossover components outputted by the mixers 96 and 98 to accordingly adjust adjustable parameters of the mixers 96 and 98, so as to minimize the signal strengths of the second-order crossover components.

Figure 4A:
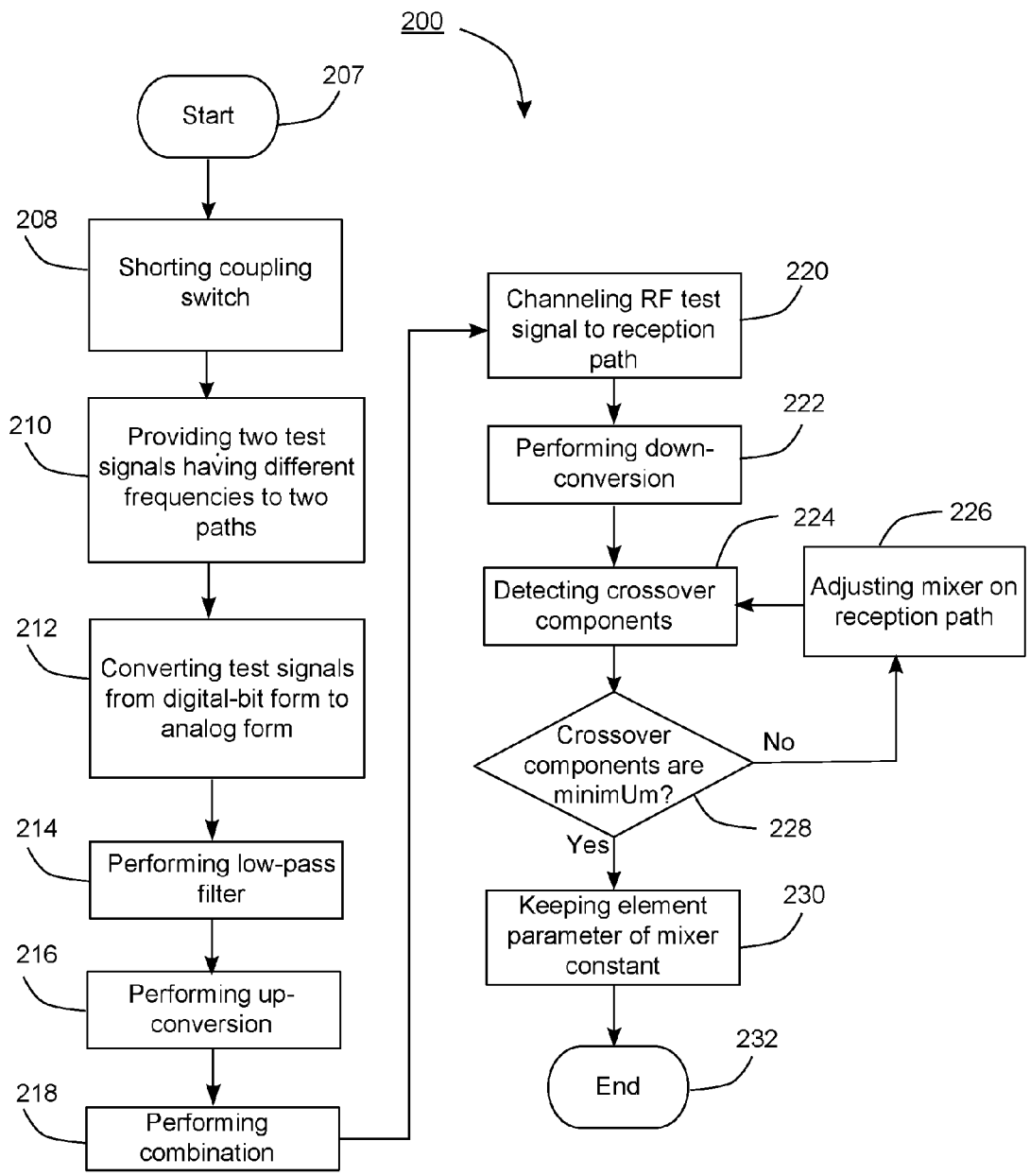
FIG. 4A is a calibration method according to an embodiment of the present invention.
Figure 4B:
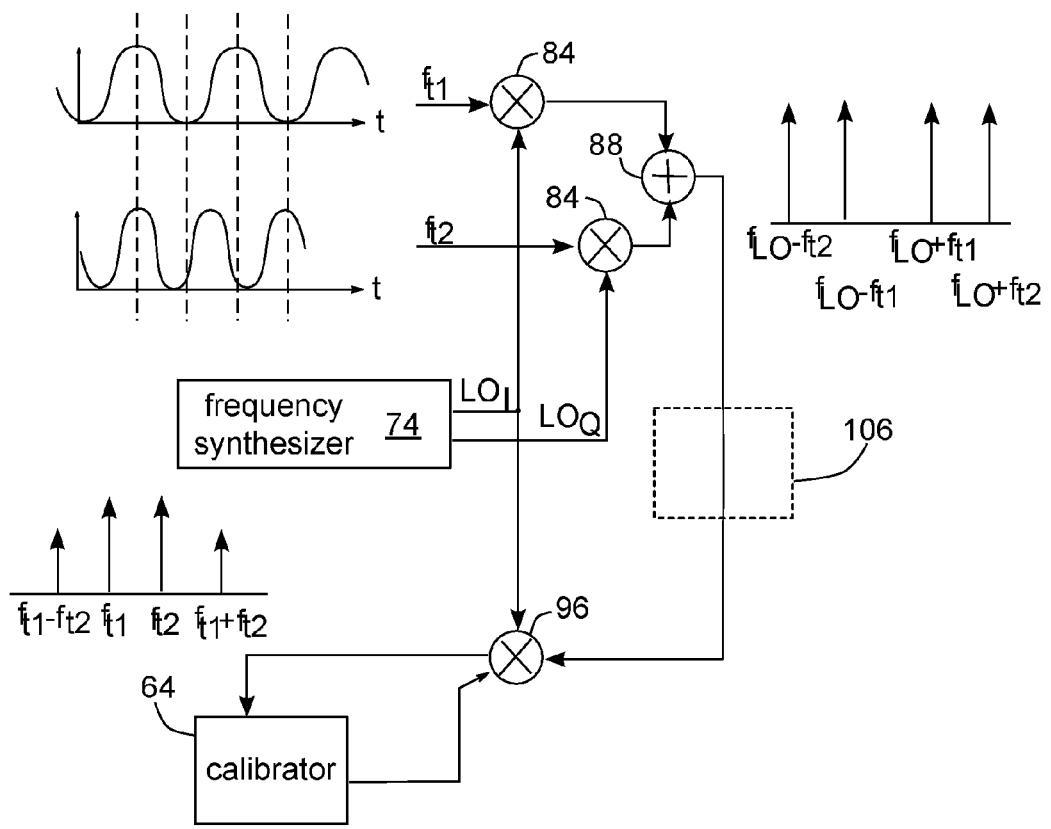
FIG. 4B depicts adopted signals and associated elements when performing the calibration method in FIG. 4A.

FIG. 4A shows a flowchart of a calibration method 200 according to an embodiment of the present invention. The calibration method 200 is applicable to the calibration system 60. FIG. 4B depicts adopted signals and associated elements when performing the calibration method in FIG. 4A. It should be noted that other mixers in the receiver 76 may also be sequentially calibrated with the same approach after the mixer 96 is calibrated. To reduce the time of calibration, the calibrator 64 may simultaneously calibrate the mixer 96 and other mixers.

Figure 1:
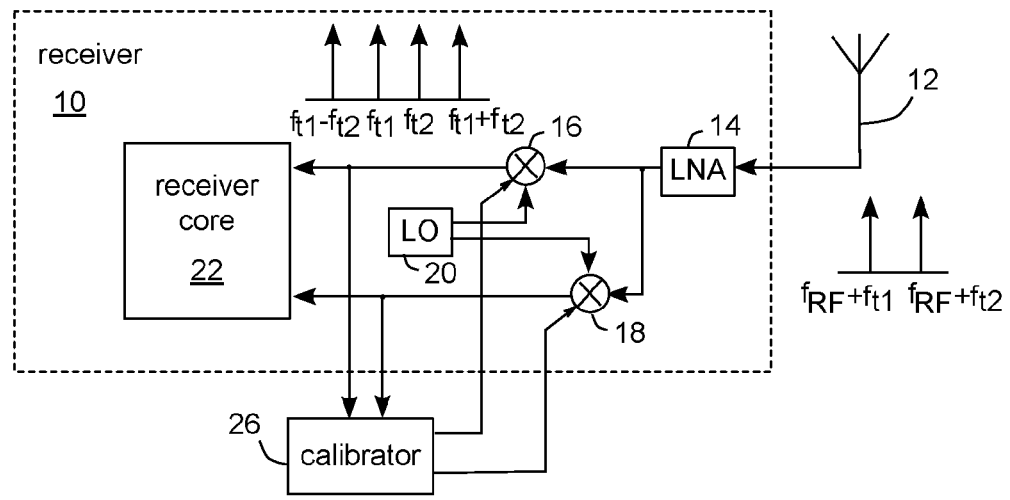
FIG. 1 is a direct-conversion receiver which can be calibrated.
Figure 2:
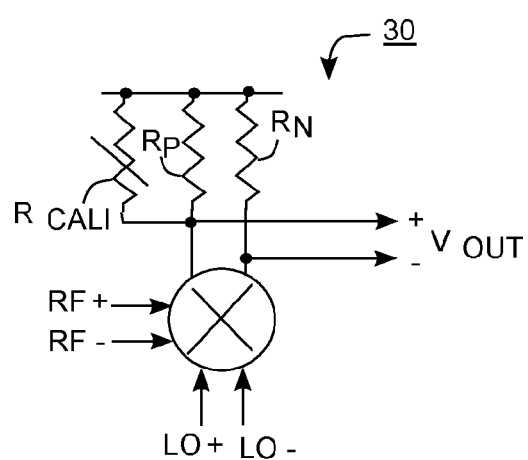
FIG. 2 is a mixer which can be calibrated.

When operating in a calibration mode, the calibration process 200 for second-order intermodulation distortion of the mixer 96 begins with step 207 in FIG. 4. In step 208, the calibrator 64 first activates the coupling switch 106, i.e., shorts the coupling switch 106, to couple the output of the adder 88 to an input of the mixer 96. In the calibration mode, the power amplifier 100 and the lower-noise amplifier 94 may be selectively turned off to not only save power consumption but also prevent signals from the antenna 90 from interfering the calibration process. In step 210, the calibrator 64 prompts the digital logic circuit 78 to respectively provide two test signals having different frequencies to two transmission paths. For example, the frequencies of the test signals are respectively $f_{t1}$ and $f_{t2}$. The DAC 80, the lower-pass filter 82, the mixers 84 and 86, and the adder 88, respectively provide operations including conversion from a digital form to an analog form in step 212, low-pass filter in step 214, up-conversion in step 216 and combination in step 218, as those in the transmission mode. As shown in FIG. 4B, the RF test signal generated in the adder 88 contains four test components respectively having frequencies $f_{t1}-f_{LO}$, $f_{LO}-f_{t1}$, $f_{t2}+f_{LO}$ and $f_{LO}-f_{t2}$, where $f_{LO}$ is the oscillation frequency of the local oscillation signals $LO_I$ and $LO_Q$. In another embodiment, a part of the test components may also be filtered and removed by an additional hardware structure such as a filter. In step 220, the shorted coupling switch 106 channels the test RF signal to the mixer 96. At this point, same as in the reception mode, the mixer 96 down-converts the RF test signal. While down-converting the RF test signal, due to the possible non-linearity in the mixer 96, in addition to the two target signals (having frequencies $f_{t1}$ and $f_{t2}$) obtained after the down-conversion, a test result signal outputted from the mixer 96 also contains unsolicited second-order crossover components (having frequencies $(f_{t1}+f_{t2})$ and $(f_{t1}-f_{t2})$), as shown in FIG. 4B. The calibrator 64 detects the output of the mixer 96 in step 224 to accordingly adjust the mixer 96 in step 226. In an embodiment, the mixer 96 has the filter structure shown in FIG. 2; the calibrator 64 detects a resistance value of the calibration resistor $R_{CALI}$, or other adjustable element parameters, e.g., a bias of a transistor serving as a switch in the mixer. In step 230, when the signal strength reaches a minimum value, the calibrator 64 keeps the adjustable element parameters in the mixer 96 constant. For example, a calibration result of the mixer 96 may be recorded in a recorder similar to a latch or a trim fuse, and the recorder controls the element parameters in the mixer 96. The calibration process for the second-order intermodulation distortion of the mixer 96 ends in step 232. In the subsequent reception mode, the mixer 96 performs down-conversion according to the constant element parameters, such that the second-order intermodulation distortion caused by the mixer 96 can be minimized.

In FIG. 3 and FIG. 4B, the coupling switch 16 is coupled between the adder 88 of the transmitter 72 and the mixer 96 of the receiver 76. It should be noted that the coupling switch 106 is not limited to the above arrangement. In an alternative embodiment, the coupling switch 106 may be coupled between the output of the adder 88 and the input of the low-noise amplifier 94; in another alternative embodiment, the coupling switch 106 is coupled between the output of the power amplifier 100 and the input of the low-noise amplifier 94.

Distinctive from the prior art that is performed in a final test phase, the calibration method in FIG. 4A and FIG. 4B may be performed in various productive stages to fit designer preferences. In an embodiment, the calibration process for the second-order intermodulation distortion of the mixer 96 is performed in a final test of an integrated circuit, and a user utilizing the transceiver 62 for transmitting signals does not undergo the calibration process of the mixer 96. In yet another embodiment, for an integrated circuit including the calibrator 64, instead of calibrating the mixer 96 during a final test, a calibration process for second-order intermodulation distortion of the mixer 96 is performed each time when a user activates a normal boot-on procedure. It should be noted that the present invention is not limited to performing the calibration process during a boot-on procedure. In another embodiment, the calibration process may be performed each time before signals are received. Since all signals are generated within the integrated circuit, the calibration method implemented by the present invention almost needs no additional external devices while also substantially reducing the calibration time.

It is demonstrated by FIG. 4A, FIG. 4B and associated descriptions that, the calibration system 60 according to an embodiment of the present invention thoroughly adopts native devices inherited from a reception mode and a transmission mode. From perspectives of circuit manufacturing costs, the calibration system 60 require nearly no additional circuit costs. Further, the calibrator 64, the coupling switch 106 and the recorder may be regarded as a calibration apparatus, and the calibration system 60 may be regarded as including the calibration apparatus and the transceiver 62. The transceiver 62 requires only the digital logic circuit 18 having adjustable signal frequencies to provide modulation signals needed by the communication system when operating in the transmission mode, and to provide two test signals having different frequencies when operating in the calibration mode. The digital logic circuit 18 may be implemented by making simple modifications to a conventional digital logic circuit.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A second-order intermodulation distortion calibration transceiver system, comprising:
 a transmitter, comprising:
  a logic circuit, configured to provide two modulation signals, wherein the two modulation signals have different frequencies when the calibration transceiver system operates in a calibration mode; and
  two transmission paths, configured to up-convert and combine the two modulation signals to a radio-frequency (RF) transmission signal; and
 a receiver, comprising:
  a reception path, configured to down-convert an RF reception signal to a baseband reception signal, and said RF transmission signal serves as the RF reception signal when the calibration transceiver system operates in the calibration mode; and
  a baseband signal processor, configured to process the baseband reception signal; and
  a calibrator, configured to adjust the reception path in the calibration mode to minimize a signal strength of a second-order crossover component of the baseband reception signal;
 a coupling switch, coupled to the transmitter, the receiver and the calibrator, for selectively providing a closed circuit such that the RF transmission signal serves as the RF reception signal to be provided to the receiver;
 wherein, the calibrator further controls the coupling switch to selectively provide the closed circuit; and
 wherein, the two modulation signals comprise a first modulation signal and a second modulation signal, the two transmission paths comprise a first transmission path and a second transmission path, the first modulation signal is transmitted to the first transmission path, and the second modulation signal is transmitted to the second transmission path.

2. The calibration transceiver system according to claim 1, wherein when operating in the calibration mode, the coupling switch is controlled to provide the closed circuit such that the RF transmission signal serves as the RF reception signal to be provided to the receiver; when operating in a transmission mode, the coupling switch is controlled to provide an open circuit such that the RF transmission signal is isolated from the receiver.

3. The calibration transceiver system according to claim 1, wherein the controller prompts the coupling switch to provide the closed circuit or the open circuit by controlling an equivalent impedance of the coupling circuit with respect to the RF signal.

4. The calibration transceiver system according to claim 1, wherein the reception path comprises a mixer configured to down-convert the RF reception signal to generate the baseband reception signal; when operating in the calibration mode, the calibrator adjusts an element parameter of the mixer to minimize the signal strength of the second-order crossover component of the baseband reception signal.

5. The calibration transceiver system according to claim 4, further comprising a recorder configured to record the adjusted element parameter; wherein, when operating in a reception mode, the mixer adopts the adjusted element parameter.

6. A second-order intermodulation distortion calibration apparatus, applied to an RF transceiver, the RF transceiver comprising:
 a transmitter, comprising:
  a logic circuit, configured to provide two modulation signals;
  two transmission paths, configured to up-convert and combine the two modulation signals to an RF transmission signal; and
 a receiver, comprising:
  a reception path, configured to down-convert an RF reception signal to a baseband reception signal serving as a baseband reception signal; and
  a baseband signal processor, configured to process the baseband reception signal;
 the calibration apparatus comprising:
  a calibrator, configured to control the logic circuit to provide the two modulation signals having different frequencies when the calibration apparatus operates in a calibration mode, utilizing the RF transmission signal as the RF reception signal to be provided to the reception path, and adjusting the reception path to minimize a signal strength of a second-order crossover component of the baseband reception signal;
  a coupling switch, coupled to the transmitter, the receiver and the calibrator, for selectively providing a closed circuit such that the RF transmission signal serves as the RF reception signal to be provided to the receiver;
 wherein, the calibrator further controls the coupling switch to selectively provide the closed circuit; and
 wherein, the two modulation signals comprise a first modulation signal and a second modulation signal, the two transmission paths comprise a first transmission path and a second transmission path, the first modulation signal is transmitted to the first transmission path, and the second modulation signal is transmitted to the second transmission path.

7. The calibration apparatus according to claim 6, wherein when operating in the calibration mode, the coupling switch is controlled to provide the closed circuit such that the RF transmission signal serves as the RF reception signal to be provided to the receiver; when operating in a transmission mode, the coupling switch is controlled to provide an open circuit such that the RF transmission signal is isolated from the receiver.

8. The calibration apparatus according to claim 6, wherein the controller prompts the coupling switch to provide the closed circuit or the open circuit by controlling an equivalent impedance of the coupling circuit with respect to the RF signal.

9. The calibration apparatus according to claim 6, wherein the RF reception path comprises a mixer configured to down-convert the RF reception signal to generate the baseband reception signal; when operating in the calibration mode, the calibrator adjusts an element parameter of the mixer to minimize the signal strength of the second-order crossover component of the baseband reception signal.

10. The calibration apparatus according to claim 9, further comprising a recorder configured to record the adjusted element parameter; wherein, when operating in a reception mode, the mixer adopts the adjusted element parameter.

11. A second-order intermodulation distortion calibration method, applied to an RF transceiver, the RF transceiver comprising a transmitter and a receiver, the transmitter comprising a logic circuit and two transmission paths;
the calibration method comprising:
generating two modulation signals having different frequencies by the logic circuit;
up-converting and combining the two modulation signals to an RF transmission signal by the two transmission paths;
channeling the RF transmission signal to the receiver to serve as an RF reception signal;
down-converting the RF reception signal to generate a baseband reception signal; and
detecting a signal strength of a second-order crossover component of the baseband reception signal to accordingly adjust the receiver;
wherein a coupling switch is coupled between the transmission path and the reception path to selectively provide a closed circuit for channeling the RF transmission signal to the receiver to serve as the RF reception signal; and
wherein, the two modulation signals comprise a first modulation signal and a second modulation signal, the two transmission paths comprise a first transmission path and a second transmission path, the first modulation signal is transmitted to the first transmission path, and the second modulation signal is transmitted to the second transmission path.

12. The calibration method according to claim 11, wherein the reception path comprises a mixer configured to down-convert the RF reception signal to generate the baseband reception signal; the adjusting step adjusts an element parameter of the mixer according to the signal strength of the second-order crossover component of the baseband reception signal.

13. The calibration method according to claim 12, further comprising:
recording the element parameter, such that the mixer adopts the element parameter when the receiver receives the RF reception signal via an antenna.

14. The calibration method according to claim 11, wherein when the RF transmission signal serves as the RF reception signal, the coupling switch is controlled to provide the closed circuit; when the RF transmission signal is transmitted via an antenna, the coupling switch is controlled to provide an open circuit to isolate the RF transmission signal from the receiver.

15. The calibration transceiver system according to claim 1, wherein a calibration process for a second-order intermodulation distortion of the mixer is performed in a final test of an integrated circuit, or the calibration process for the second-order intermodulation distortion of the mixer is performed each time when a user activates a normal boot-on procedure.

* * * * *